(12) United States Patent
Brown et al.

(10) Patent No.: US 8,922,768 B2
(45) Date of Patent: Dec. 30, 2014

(54) MULTI-PATH SPECTROMETER

(75) Inventors: William J. Brown, Durham, NC (US); Michael E. Sullivan, Raleigh, NC (US)

(73) Assignee: Wasatch Photonics, Inc., Logan, UT (US)

( * ) Notice: Subject to any disclaimer, the term of this patent is extended or adjusted under 35 U.S.C. 154(b) by 0 days.

(21) Appl. No.: 13/252,744

(22) Filed: Oct. 4, 2011

(65) Prior Publication Data

US 2012/0176615 A1 Jul. 12, 2012

Related U.S. Application Data

(60) Provisional application No. 61/389,634, filed on Oct. 4, 2010.

(51) Int. Cl.
- *G01J 3/28* (2006.01)
- *G01J 3/02* (2006.01)
- *G01J 3/36* (2006.01)
- *G01B 9/02* (2006.01)

(52) U.S. Cl.
CPC ............... *G01J 3/024* (2013.01); *G01J 3/2803* (2013.01); *G01J 3/0294* (2013.01); *G01J 3/0218* (2013.01); *G01J 3/36* (2013.01); *G01B 9/02091* (2013.01); *G01B 9/02004* (2013.01)
USPC ........................................................ 356/328

(58) Field of Classification Search
USPC .................................. 356/326, 328, 331, 334
See application file for complete search history.

(56) References Cited

U.S. PATENT DOCUMENTS

| | | | | |
|---|---|---|---|---|
| 5,638,173 | A | * | 6/1997 | Smith et al. .................... 356/301 |
| 6,810,165 | B2 | * | 10/2004 | Golub et al. .................... 385/18 |
| 8,131,123 | B2 | * | 3/2012 | Presley et al. .................... 385/18 |
| 2009/0028414 | A1 | * | 1/2009 | Crandall et al. ............... 382/133 |
| 2010/0014081 | A1 | * | 1/2010 | Huening et al. ............... 356/328 |

OTHER PUBLICATIONS

M. V. Sarunic, M. A. Choma, C. Yang, J. A. Izatt, "Instantaneous complex conjugate resolved spectral domain and swept-source OCT using 3×3 fiber couplers", Feb. 7, 2005 / vol. 13, No. 3 / Optics Express 957-67.

* cited by examiner

*Primary Examiner* — Abdullahi Nur

(57) ABSTRACT

A spectrometer in accordance with the present disclosure may provide multiple optical paths from the inputs to the camera, where the paths are as nearly identical as possible. For example, a spectrometer in accordance with the present disclosure may include multiple inputs, input optics, a diffraction grating, output optics, and a camera. The multiple inputs may be imaged onto different sections of the camera using the same input optics, the same diffraction grating, and the same output optics.

11 Claims, 6 Drawing Sheets

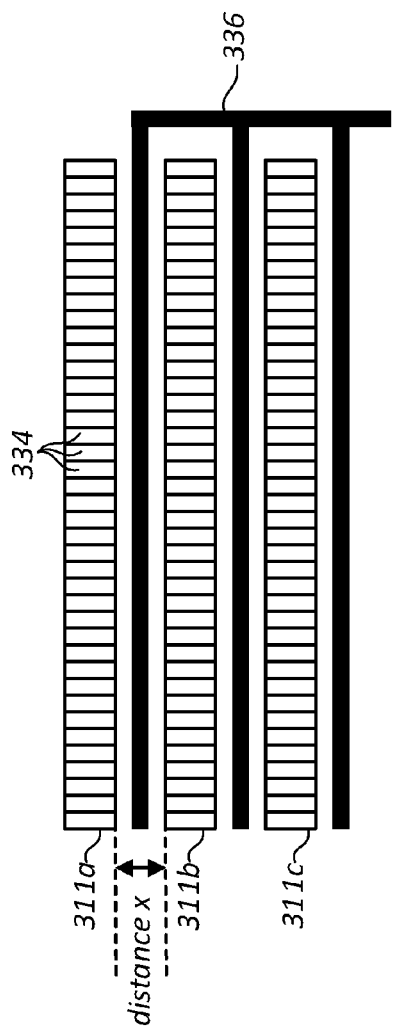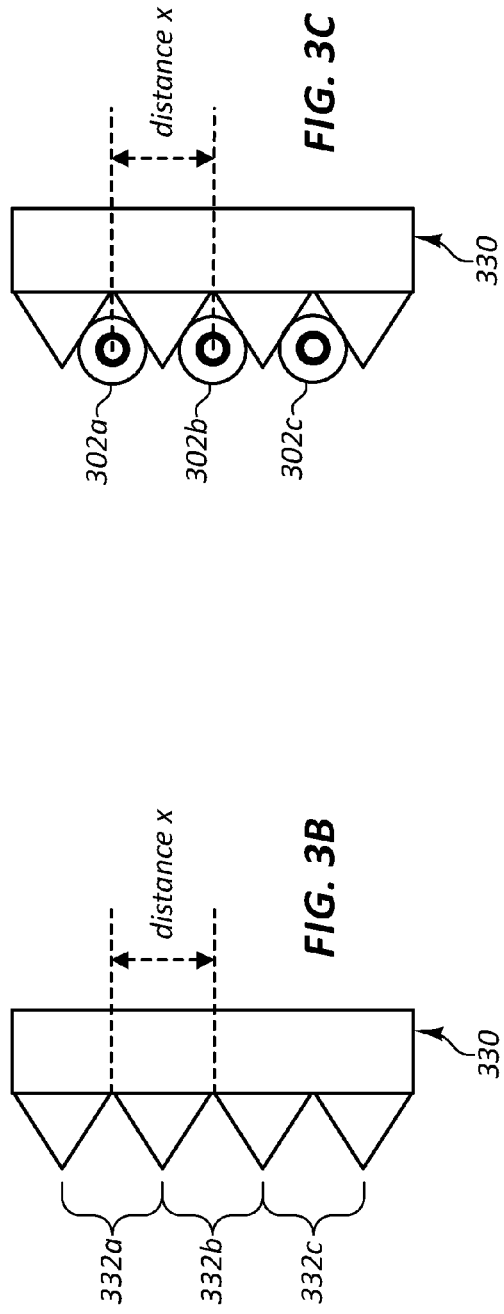

MULTI-PATH SPECTROMETER

PRIORITY CLAIM

This application claims the benefit of U.S. Provisional Patent Application No. 61/389,634, filed Oct. 4, 2010, for a "Multi-Path Spectrometer," with inventors William J. Brown and Michael E. Sullivan.

TECHNICAL FIELD

The present disclosure relates generally to the field of spectroscopy.

BRIEF SUMMARY

The present disclosure relates generally to a spectrometer that provides multiple optical paths from the inputs to the camera, where the paths are as nearly identical as possible. For example, a spectrometer in accordance with the present disclosure may include multiple inputs, input optics, a diffraction grating, output optics, and a camera. The multiple inputs may be imaged onto different sections of the camera using the same input optics, the same diffraction grating, and the same output optics.

BRIEF DESCRIPTION OF THE DRAWINGS

FIG. 3A illustrates line scan arrays, which may be used to capture light from the multiple inputs.

FIG. 3B illustrates a v-groove array, which may be used to effect the desired positioning of the inputs.

FIG. 3C illustrates optical fibers bonded to the v-grooves in the v-groove array.

DETAILED DESCRIPTION

Figure 1:
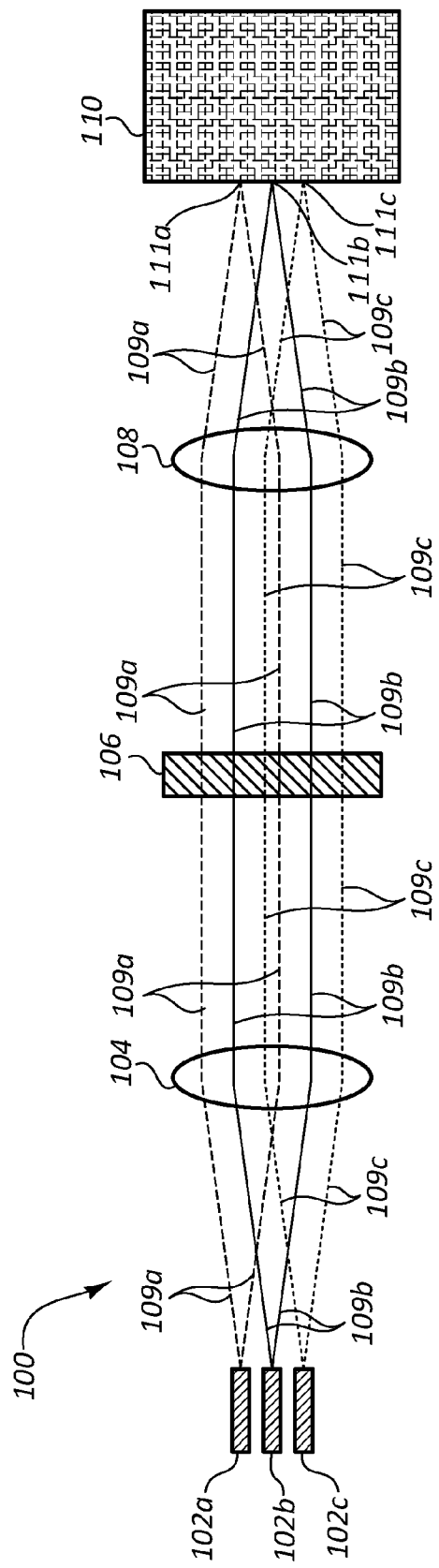
FIG. 1 illustrates various components that may be included in a spectrometer in accordance with the present disclosure, including multiple inputs, input optics, a diffraction grating, output optics, and a camera.

FIG. 1 illustrates various components that may be included in a spectrometer 100 in accordance with the present disclosure. The spectrometer 100 includes three inputs 102a-c. The inputs 102a-c may be optical fibers, apertures in the side of a housing, etc. In the depicted configuration, the inputs 102a-c are stacked vertically on top of each other.

The spectrometer 100 also includes input optics. In the depicted configuration, the input optics take the form of a collimating lens set 104. The collimating lens set 104 may include one lens or multiple lenses.

The spectrometer 100 also includes a diffraction grating 106. The diffraction grating 106 may be a volume phase holographic (VPH) grating. VPH gratings are transmission gratings. The diffraction grating 106 may be round, rectangular, or some other shape.

The spectrometer 100 also includes output optics. In the depicted configuration, the output optics take the form of a focusing lens set 108. Like the collimating lens set 104, the focusing lens set 108 may also include one lens or multiple lenses.

The spectrometer 100 also includes a camera 110. Three different optical paths 109a-c are shown from the inputs 102a-c to different sections 111a-c of the camera 110. In the depicted configuration, the optical paths 109a-c are stacked vertically on top of one another, and they overlap as they propagate through the spectrometer 100. Each of the optical paths 109a-c includes the collimating lens set 104, the diffraction grating 106, and the focusing lens set 108.

Although three inputs 102a-c and three optical paths 109a-c are shown in the depicted spectrometer 100, the scope of the present disclosure is not limited in this manner. A spectrometer in accordance with the present disclosure may include two or more inputs, and two or more optical paths.

Figure 2:
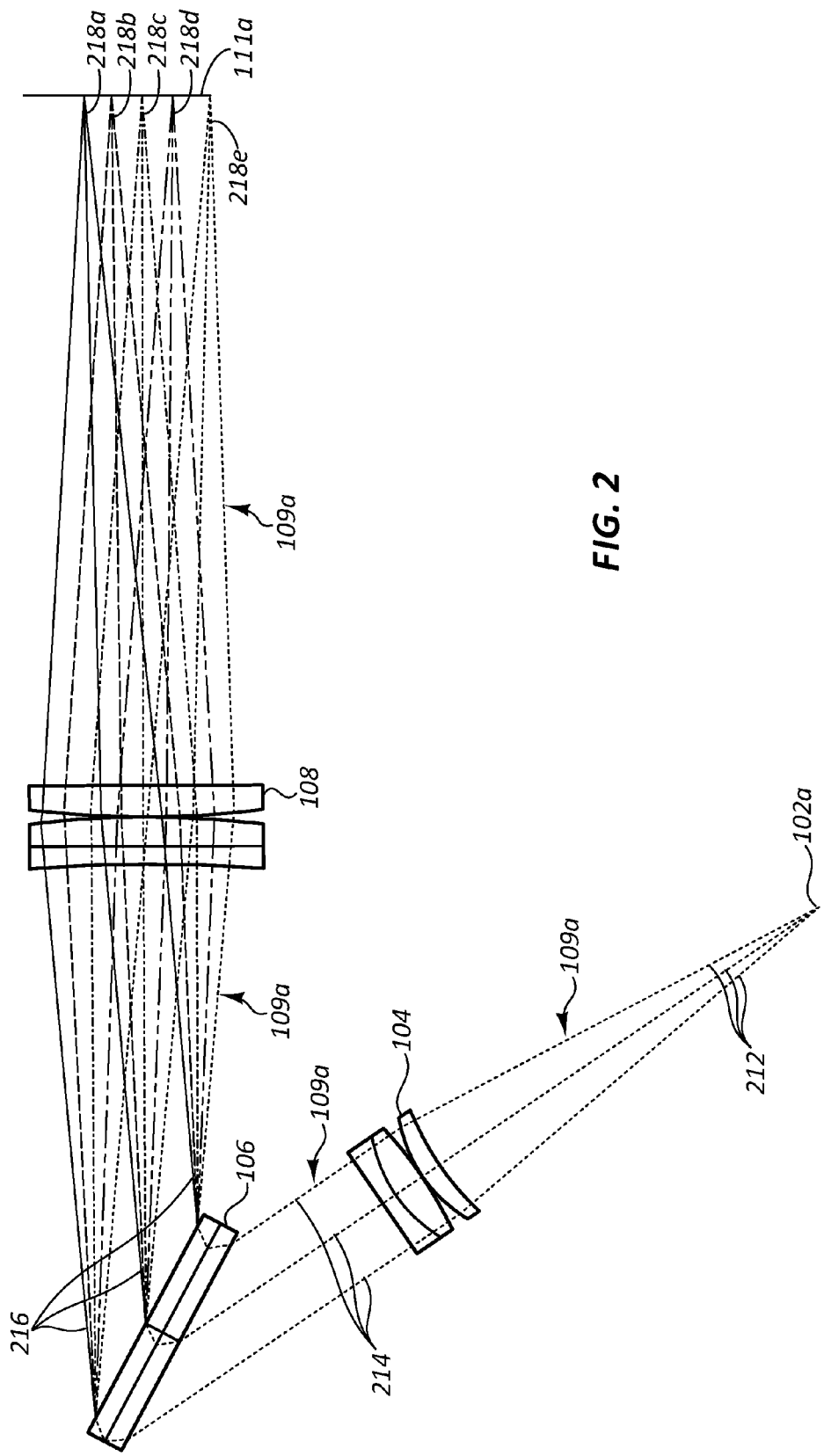
FIG. 2 is a top-down view of the components of the spectrometer shown in FIG. 1.

FIG. 2 is a top-down view of the components of the spectrometer 100 shown in FIG. 1. The optical path 109a from the input 102a to the section 111a of the camera 110 is visible. As mentioned, in the depicted configuration, the inputs 102a-c are stacked vertically, so FIG. 2 just shows the top optical path 109a with the other optical paths 109b-c hidden below.

The collimating lens set 104 collimates light 212 from the input 102a toward the diffraction grating 106 to produce collimated light 214. The collimating lens set 104 may be designed to fill as much of the diffraction grating 106 as possible, thereby improving the spectral resolution and throughput of the spectrometer 100. In one implementation, the angle of incidence on the diffraction grating 106 may be within the range of about 20 degrees to about 50 degrees.

The diffraction grating 106 diffracts the collimated light 214 to produce diffracted light 216. The diffraction grating 106 does not generate any dispersion in the vertical direction. Therefore, along the vertical axis the optical system just acts as an imaging system with a magnification set by the ratio of the focal length of the focusing lens set 108 to the focal length of the collimating lens set 104.

The focusing lens set 108 focuses different wavelengths 218a-e of the diffracted light 216 to different locations within the section 111a of the camera 110. The wavelengths 218a-e may cover the ranges, for example, 400-700 nm, 800-880 nm, 650-950 nm, 750-950 nm, 1000-1100 nm, 1260-1360 nm, 1500-1600 nm, etc.

Although not shown, light from the inputs 102b-c travels along the optical paths 109b-c in a manner that is similar to the way in which the light 212 from the input 102a travels along the optical path 109a. Thus, light from the separate inputs 102a-c is focused onto separate sections 111a-c on the camera 110. In the depicted configuration, the sections 111a-c are horizontal lines that are parallel to one another.

Ideally, the inputs 102a-c and the sections 111a-c on the camera 110 where the inputs 102a-c are focused are as close together as possible, while still permitting clear demarcation and minimal crosstalk between optical paths 109a-c. This increases the commonality of the optical paths 109a-c through the spectrometer 100 and minimizes path-to-path variation. The optics may be specified based on the wavelength of light used and the magnification needed to match the inputs 102a-c to the camera 110. Examples of wavelengths of light that may be used include around 850 nm, around 1050 nm, around 1310 nm, around 1550 nm, etc. The magnification may be in the range 1:1 up to 1:3.

In the depicted configuration, the collimating lens set 104 and the focusing lens set 108 both include three elements. However, in alternative configurations, a collimating lens set and/or a focusing lens set may consist of a different number of elements, including just a single element. Also, in configurations where a collimating lens set and/or a focusing lens set includes multiple elements, these elements may be co-located (as they are in the collimating lens set 104 and the focusing lens set 108 shown in FIG. 2), or they may be in different locations.

FIG. 3A illustrates one configuration of the sections 111a-c of the camera 110 in the spectrometer 100 shown in FIG. 1. In the depicted configuration, the sections 111a-c of the camera 110 are implemented as independent imaging sections, and more specifically, line scan arrays 311a-c. Readout circuitry 336 for the line scan arrays 311a-c is also shown.

The inputs 102a-c may be positioned so that light from the input 102a is focused on the line scan array 311a, light from the input 102b is focused on the line scan array 311b, and light from the input 102c is focused on the line scan array 311c. In other words, the line scan arrays 311a-c are endpoints for the optical paths 109a-c.

The line scan arrays 311a-c may be CCD, CMOS, InGaAs, pyroelectric, or other detector arrays. The speed of the line scan arrays 311a-c may range from 1000 lines/second up to 100,000 or more lines/second.

In the depicted configuration, the pixels 334 within the line scan arrays 311a-c have a greater height than width. Although this is not required, having "tall" pixels may simplify optical alignment and decrease sensitivity to thermal change or shock and vibration. In one implementation of the depicted configuration, each pixel 334 may have a width of approximately 5-25 microns, and the distance between adjacent line scan arrays 311a-c (i.e., "distance x" in FIG. 3A) may be within the range of 80-1000 microns, with the height being less than the spacing.

FIG. 3B illustrates a v-groove array 330, which may be used to effect the desired positioning of the inputs 102a-c so that light from the inputs 102a-c is focused on the line scan arrays 311a-c. The v-groove array 330 includes three v-grooves 332a-c, one for each of the inputs 102a-c. Adjacent v-grooves 332a-c are separated by a particular distance (i.e., "distance x" in FIG. 3B), which is the same distance that separates adjacent line scan arrays 311a-c.

FIG. 3C illustrates optical fibers 302a-c bonded to the v-grooves 332a-c in the v-groove array 330. The optical fibers 302a-c are examples of the inputs 102a-c in FIG. 1. Because adjacent v-grooves 332a-c are separated by the same distance as adjacent line scan arrays 311a-c, adjacent optical fibers 302a-c are also separated by the same distance as adjacent line scan arrays 311a-c. This permits the optical system of the spectrometer 100 to have a magnification of one.

There are many variations to the configuration depicted in FIGS. 3A-3C that fall within the scope of the present disclosure. For example, in one alternative configuration, the distance between adjacent inputs may be greater than the distance between adjacent line scan arrays, and the optical system of the spectrometer may be configured to provide an appropriate amount of "demagnification" so that light from adjacent inputs is focused onto adjacent line scan arrays. As another example, instead of having one line scan array for each input, there may be a greater number of line scan arrays than inputs, and some of the line scan arrays may be skipped. As another example, some or all of the independent imaging sections may include multiple rows of pixels (instead of just a single row of pixels, as shown in FIG. 3A). The multiple rows of pixels may be summed together.

One potential advantage of having multiple independent imaging sections is that there can be separate readout electronics for each section. This may significantly increase the readout speed, since readout can be done in parallel instead of serially.

Instead of multiple independent imaging sections, the camera 110 may include a continuous image sensor. Having a continuous image sensor enables very simple optical alignment since the only requirement is that the light is focused on the camera 110, and the rotation alignment of the camera 110 with respect to the lines of light is not particularly stringent.

The image sensor may be in spectroscopy format where the array is significantly wider (e.g., 1000 to 2000 or more pixels) than it is tall (e.g., 50 to 100 pixels). This is not a requirement, but it may be advantageous. Commercially available image sensors that fit this format include the Hamamatsu S9970-1007 and the Dalsa Falcon 2M30.

In order to increase the readout rate of an image sensor, one or more regions of interest (ROIs) may be designated within an image sensor. Readout circuitry within the image sensor may be configured so that only the pixels within the ROIs are read out, and the pixels outside of the ROIs are "dumped" (i.e., the step of converting the accumulated charge to a digital value is skipped with respect to pixels outside the ROIs).

Figure 4:
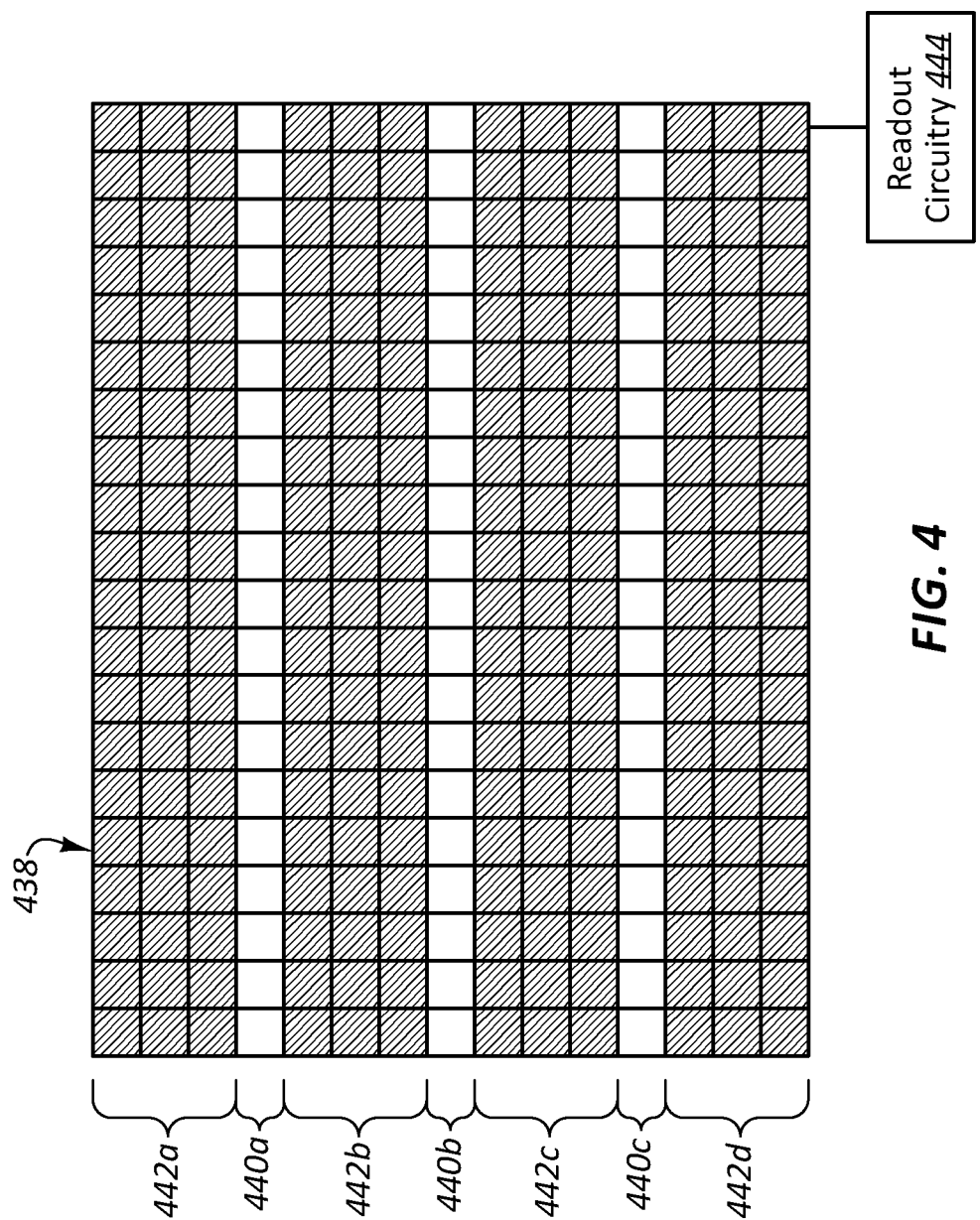
FIG. 4 illustrates an image sensor having multiple regions of interest that may be used to capture light from the multiple inputs.

FIG. 4 illustrates an image sensor 438 that may be included in the camera 110. The image sensor 438 includes multiple ROIs 440a-c, one for each of the inputs 102a-c.

The inputs 102a-c may be positioned so that light from the input 102a is focused on the ROI 440a, light from the input 102b is focused on the ROI 440b, and light from the input 102c is focused on the ROI 440c. In other words, the ROIs 440a-c are endpoints for the optical paths 109a-c.

Typically, the bottom right pixel of the image sensor 438 is read (i.e., the pixel's accumulated charge is converted to a digital value), then the bottom row is shifted to the right and the next pixel is read. When the bottom row is completed, the entire array is shifted down one row. The new row on the bottom is then read and the process is repeated.

However, in the depicted configuration, only pixels within the ROIs 440a-c need to be read. Therefore, the pixels within the unused regions 442a-d may be dumped. More specifically, after the image sensor 438 captures an image, the readout circuitry 444 may dump the rows of pixels within the unused region 442d, read the row of pixels in the ROI 440c, dump the rows of pixels within the unused region 442c, read the row of pixels within the ROI 440b, etc. By dumping the rows of pixels in the unused regions 442a-d, the readout time may be decreased significantly.

In the configuration shown in FIG. 4, each of the ROIs 440a-c includes a single row of pixels. In an alternative configuration, each ROI may include multiple rows of pixels (e.g., 2-10 pixels).

Figure 5:
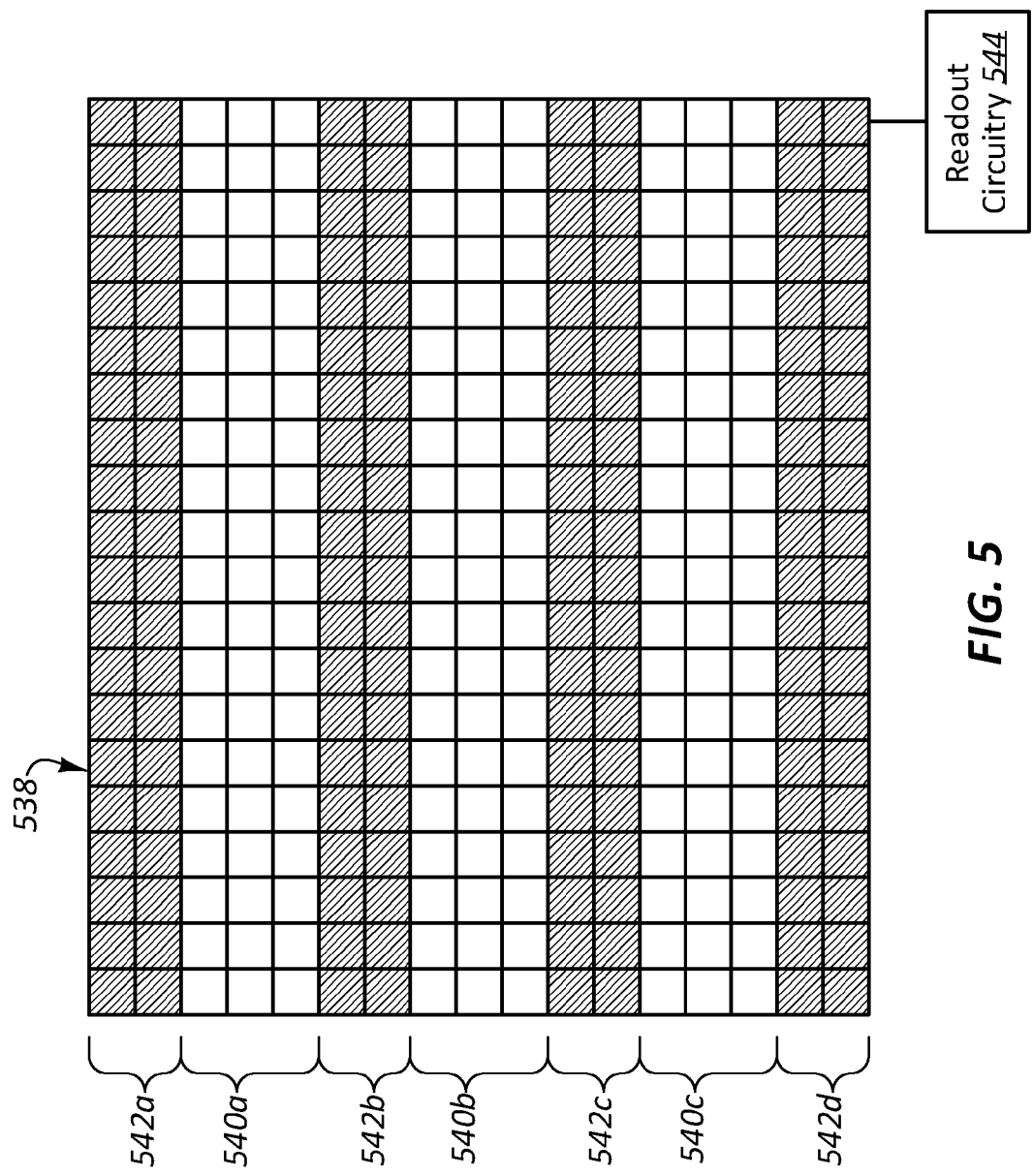
FIG. 5 illustrates another image sensor having multiple regions of interest that may be used to capture light from the multiple inputs.

FIG. 5 illustrates an image sensor 538 that may be included in the camera 110 and that includes multiple ROIs 540a-c, where each of the ROIs 540a-c has multiple rows of pixels. The rows of pixels within a particular ROI may be summed before being read. More specifically, after the image sensor 538 captures an image, the readout circuitry 544 may dump the rows of pixels within the unused region 542d, sum the rows of pixels in the ROI 540c into a single row of pixels in the ROI 540c, read that row of pixels in the ROI 540c, dump the rows of pixels in the unused region 542c, etc.

In the configurations shown in FIGS. 4 and 5, each ROI was an entire row of pixels. However, this is not required. In an alternative configuration, an ROI may only include part of a row of pixels. Some image sensors can only dump entire rows of pixels. In this case, the horizontal region of interest reduction may be performed in software.

Figure 6:
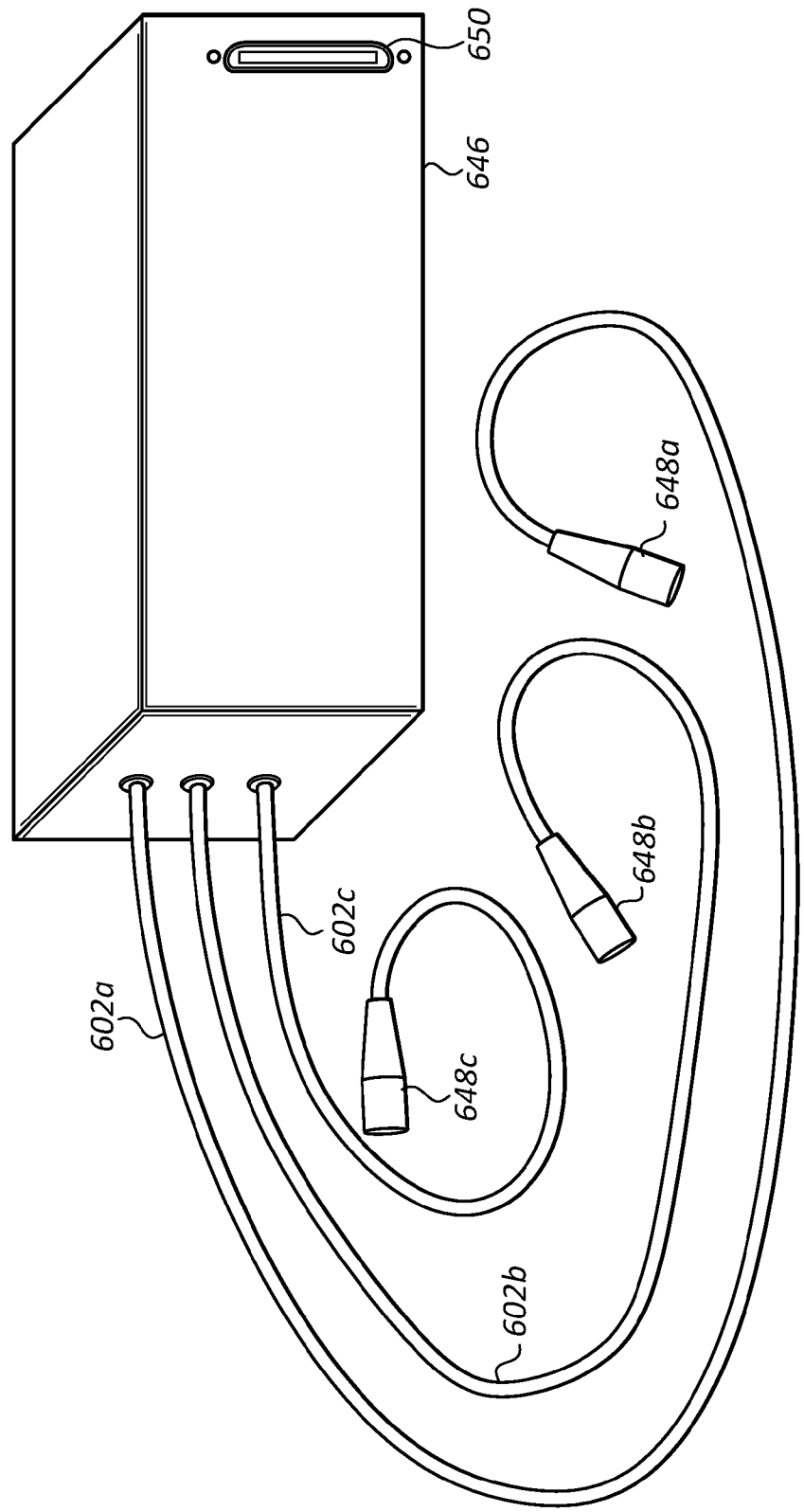
FIG. 6 illustrates one configuration of a housing for the spectrometer.

FIG. 6 illustrates one configuration of a housing 646 for the spectrometer 100. In the depicted configuration, the inputs 102a-c to the spectrometer 100 take the form of optical fibers 602a-c that are shown exiting the housing 646. The optical fibers 602a-c may have 3 mm jackets, 2 mm jackets, 900 micron jackets, a 250 micron cladding, etc. In an alternative configuration, instead of optical fibers 602a-c, the housing 646 may have free space optical inputs where the inputs 102a-c to the spectrometer 100 are apertures in the side of the housing 646.

Connectors 648a-c are shown at the ends of the optical fibers 602a-c. Examples of connectors 648a-c that may be used include FC/APC, FC/PC, SC, SMA, etc. In an alternative configuration, bulkhead connectors may be used instead of the depicted connectors 648a-c.

The housing 646 includes an electronic/electrical connector 650 that provides power and data communication to the camera 110. In an alternative configuration, instead of just a single electronic/electrical connector 650, the housing 646 may include multiple electronic/electrical connectors.

The optical components of the spectrometer 100 (e.g., the collimating lens set 104, the diffraction grating 106, and the focusing lens set 108) may be mounted as rigidly as possible to the housing 646. In addition, these components may be configured to work over an operating temperature of at least 10-50 degrees Celsius. However, the scope of the claimed invention should not be limited in this regard.

In the depicted configuration, the camera 110 is inside the housing 646. An alternative configuration may include a standalone camera that is outside of the housing. In such a configuration, the camera may be physically attached to the housing by bolts or other mechanisms.

Two possible applications of a spectrometer in accordance with the present disclosure will now be described. Both of the applications that will be described relate to the field of optical coherence tomography (OCT).

Optical coherence tomography is an established imaging modality with numerous medical applications and some uses in industry. Fourier domain OCT is the standard for most applications. FD-OCT comes in two varieties, swept source (SS) and spectral domain (SD). In both cases the reference arm path length is fixed, data is collected from a single sample point at a range of wavelengths, and the resulting signal is processed and Fourier transformed to provide the signal strength as a function of depth. The Fourier transform results in an ambiguity since it is now impossible to differentiate sample pathlengths that are shorter than the reference arm versus sample arm pathlengths that are longer than the reference arm. This is typically dealt with by putting the sample on one side of the DC point (typically longer sample arm pathlengths) and making sure that there is no signal from the other side (the shorter sample arm pathlengths). As an example, in FD-OCT retinal scanners, the DC (or zero pathlength difference) point is just in front of the retina and the deeper one goes into the retina, the longer the pathlength. The shorter pathlengths are now in the vitreous inside the eye where almost no light is scattered back.

It has been shown that by collecting additional signal information, it is possible to resolve the complex conjugate ambiguity, thereby expanding the useful imaging range by a factor of two and simplifying system design and operation. For example, in an article titled "Instantaneous complex conjugate resolved spectral domain and swept-source OCT using 3×3 fiber couplers" by Sarunic et al., the authors show two methods of resolving the complex conjugate ambiguity, which are both based on a 3×3 coupler. The first uses a low coherence light source, the 3×3 coupler, and multiple spectrometers. The second uses a swept laser source, the 3×3 coupler, and multiple photodiodes. The authors point out that in both configurations, the paths of the systems after the light has been mixed in the 3×3 coupler need to be as identical as possible. Any variation may result in artifacts within the image. For the spectral domain implementation, they suggest that the variation in their two spectrometers is the primary source of image artifact. Thus, a spectrometer in accordance with the present disclosure may be used for complex conjugate resolution in an OCT system. More specifically, a spectrometer in accordance with the present disclosure may be used in a 3×3 OCT configuration to reduce or minimize image artifacts due to variations in the light collection in the different arms of the coupler.

Another application for a spectrometer in accordance with the present disclosure relates to increasing the scan rate of OCT systems. Since live tissue targets almost always have motion associated with them, the faster the OCT scanning, the better the image quality and the more tissue area that can be imaged. This is particularly important for 3D images where a single scan can take anywhere from a fraction of a second up to 10 or more seconds. Increasing the scan speed can be accomplished by sampling more than one point at a time. There are many scan head architectures that can accomplish this. In this case one needs more power from the light source and multiple detection paths. For swept source systems additional detection paths are fairly cheap, but generating more optical power from the swept laser source can be very expensive. In spectral domain systems, multiple relatively inexpensive SLDs or higher power SLDs can be used. However, on the detection side, multiple spectrometers may be needed, adding significant cost. Thus, a spectrometer in accordance with the present disclosure may be used to collect OCT a-scans from multiple points on the sample in a cost effective manner.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A spectrometer configured for optical coherence tomography imaging, comprising: multiple inputs; input optics; a diffraction grating, wherein the diffraction grating is a transmission grating, and wherein the input optics comprise a collimating lens set that collimates light from the multiple inputs toward the diffraction grating; output optics; and a camera that is configured to image multiple lines at a rate of at least 1000 lines/second; wherein the light from the multiple inputs are is focused onto independent imaging sections of the camera using the same input optics, the same diffraction grating, and the same output optics, wherein: the multiple inputs comprise a first input and a second input; there is a first optical path from the first input to a first section of the camera; there is a second optical path from the second input to a second section of the camera; and the first optical path overlaps with the second optical path.

2. The spectrometer of claim 1, wherein the independent imaging sections of the camera are parallel horizontal lines.

3. The spectrometer of claim 1, wherein:
the output optics comprise a focusing lens set;
the diffraction grating diffracts collimated light to produce diffracted light; and
the focusing lens set focuses different wavelengths of the diffracted light to different ones of the independent imaging sections of the camera.

4. The spectrometer of claim 1, wherein the independent imaging sections comprise line scan arrays.

5. The spectrometer of claim 4, wherein pixels within the line scan arrays have a greater height than width.

6. The spectrometer of claim 1, further comprising
a v-groove array, wherein the multiple inputs comprise optical fibers that are bonded to v-grooves within the v-groove array.

7. The spectrometer of claim 6, wherein:
the independent imaging sections of the camera are separated by a particular distance; and
the v-grooves within the v-groove array are separated by the same distance as the independent imaging sections of the camera.

8. The spectrometer of claim 1, wherein the independent imaging sections of the camera comprise different regions of interest within an image sensor.

9. The spectrometer of claim 8, wherein each region of interest consists of a single row of pixels.

10. The spectrometer of claim 8, wherein at least one region of interest comprises multiple rows of pixels that are summed together.

11. The spectrometer of claim 8,
wherein the image sensor comprises readout circuitry that is configured to read pixels that are located within any region of interest, and dump pixels that are located outside of any region of interest.

* * * * *